Figure 4:
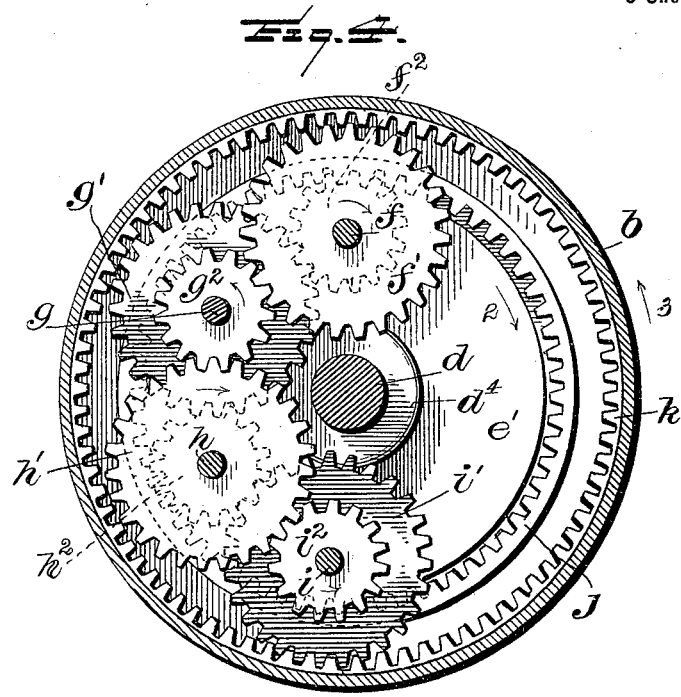

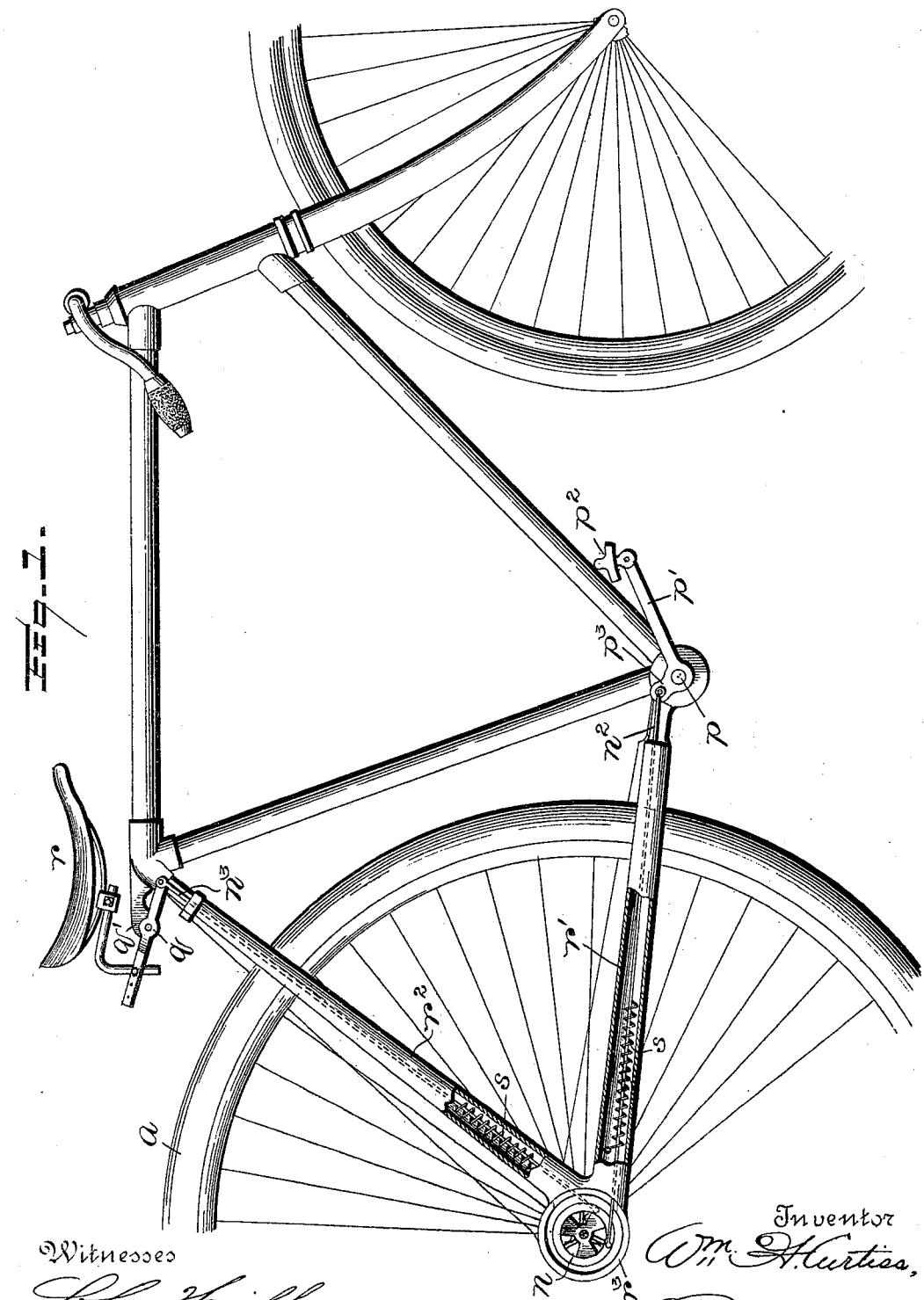

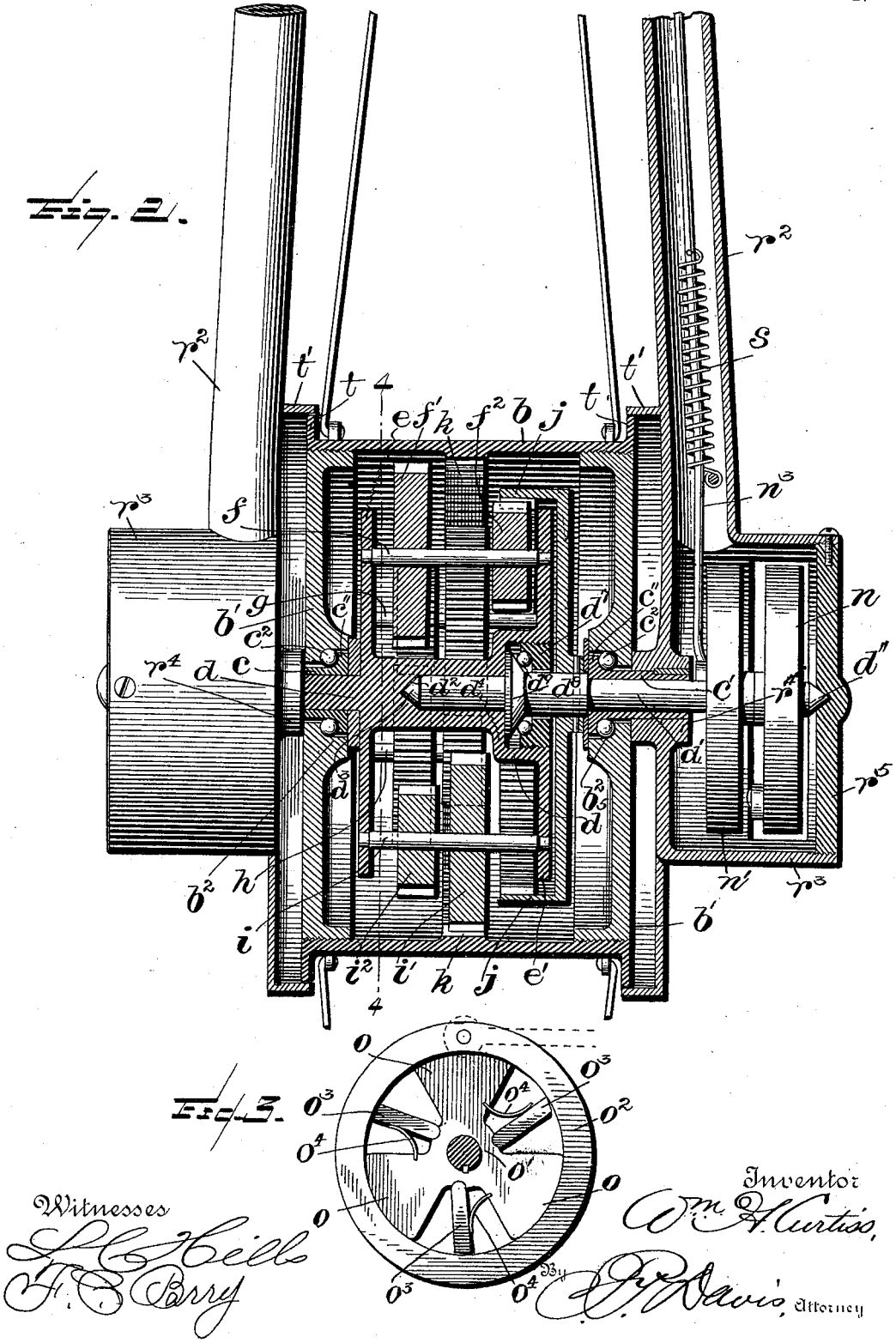

No. 642,816. Patented Feb. 6, 1900.
W. H. CURTISS.
BICYCLE GEARING.
(Application filed June 28, 1899.)
(No Model.) 3 Sheets—Sheet 3.

Witnesses  Inventor
  Wm. H. Curtiss,
By ..... Davis, Attorney

UNITED STATES PATENT OFFICE.

WILLIAM H. CURTISS, OF BUFFALO, NEW YORK.

BICYCLE-GEARING.

SPECIFICATION forming part of Letters Patent No. 642,816, dated February 6, 1900.

Application filed June 28, 1899. Serial No. 722,115. (No model.)

*To all whom it may concern:*

Be it known that I, WILLIAM H. CURTISS, a citizen of the United States, residing at Buffalo, in the county of Erie and State of New York, have invented certain new and useful Improvements in Bicycle-Gearing; and I do declare the following to be a full, clear, and exact description of the invention, such as will enable others skilled in the art to which it appertains to make and use the same, reference being had to the accompanying drawings, and to the letters of reference marked thereon, which form a part of this specification.

The primary object of the invention is to provide an improved form of self-contained gearing whereby power applied to drive certain members thereof in opposite directions results in multiplication of speed in the final driven member. In the form of gearing I have chosen to illustrate in the present case as an embodiment of this part of my invention an internal gear is driven in one direction and a train of planetary gearing is driven as a whole in the opposite direction, the member of said train at one end thereof meshing with the said internal gear, while the member at the opposite end of the train meshes with another internal gear concentric with the first and when the gearing is embodied in a bicycle carried by the hub of the driven ground-wheel, which hub constitutes a casing for the whole gearing above described.

While gearing of the above description is not dependent for operativeness on any one form of driving means, it is a further object of my invention to provide a novel form of means for use in a bicycle or other manually-propelled vehicle whereby muscular energy of the rider can be more effectively applied than with the arrangements heretofore in vogue. In carrying out this object I arrange for utilizing the weight of the rider as a propulsive force and take full advantage of the powerful action of the limbs in straightening after the manner of a toggle, whereby not only is there obtained force to oppositely rotate the elements of the gearing heretofore specified, but also to raise the body which in lowering upon bending of the rider's limbs supplements the propulsive effect of straightening the latter by further rotating the before-mentioned gearing elements oppositely through suitable connections, preferably similar to those employed in transmitting power directly resultant from the straightening of the rider's limbs.

A still further object of the invention is to preserve a compactness of construction by carrying the driving connections through the framework of the machine, which provision, together with that of incasing the gearing in the hub of the ground-wheel, has the further advantage of preventing injury to the working parts and interference with the proper operation thereof by becoming clogged with dirt.

With the above-stated objects in view the invention consists in a number of novel constructions and combinations of parts, the essential elements of which are enumerated in the appended claims and a preferred form of embodiment of which is illustrated in the accompanying drawings and specifically described hereinafter.

Figure 3:
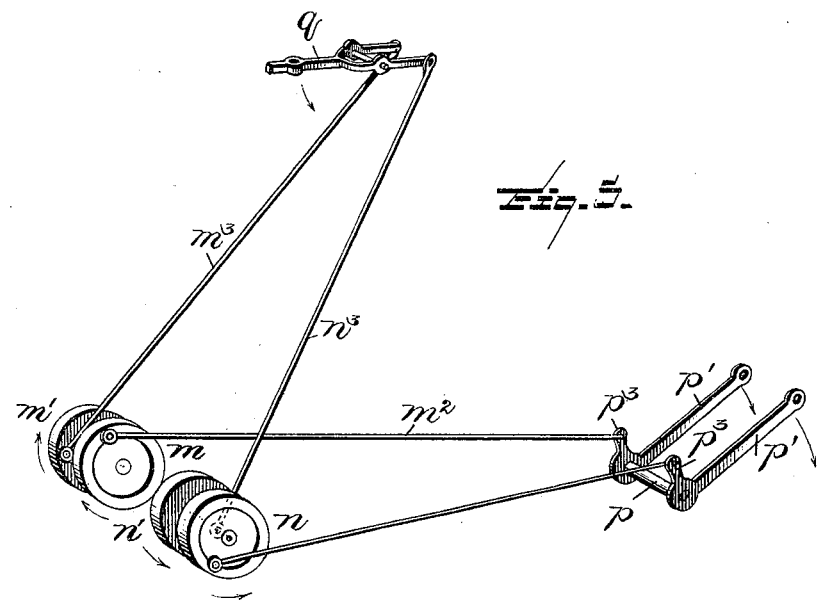

Of said drawings, Figure 1 represents mainly in side elevation a sufficient portion of a bicycle of the well-known safety type to show the application of my invention thereto, certain portions of the framework being removed or broken away to disclose constructions within the same. Fig. 2 represents on a considerably-enlarged scale as compared with Fig. 1 a vertical section taken axially of the rear wheel, the frame being shown in section at one side and in elevation at the other. Fig. 3 illustrates in side elevation a form of clutch which may be employed in the machine. Fig. 4 is a section on line 4 4 of Fig. 1. Fig. 5 is a perspective view of the saddle and pedal-operated means for driving the machine.

In the drawings the reference-letter $a$ designates the rear ground-wheel of the machine, whose hub comprises a cylindrical portion $b$, interiorly screw-threaded at each end, and heads or disks $b'$, engaging said screw-threads and centrally apertured, with ball-races $b^2$ around the apertures. Sleeves $c$ and $c'$ are fastened in the frame of the machine and are formed with cones $c''$, which confront said races, balls $c^2$ being interposed between the cones and the races to provide an antifriction-bearing for the rear ground-wheel to run upon.

The said sleeves constitute bearings for an axle composed of two telescoping members $d$ and $d'$, one formed with an axial bore entering from the inner end and terminating in a conical socket $d^2$, and the other axle-section occupying said bore and having a conical end $d^3$, whose point centers in the apex of the conical socket. A ball box or cup is formed on the inner end of the axle-section $d$ by an outstanding flange $d^4$ thereon and a cylindrical flange $d^5$ springing from the same and interiorly screw-threaded to receive a ball-race $d^7$. A conical enlargement $d^8$ is formed upon the axle-section $d'$, its base taking over the end face of the other axle-section and its sloping side confronting the race $d^7$, between which and said conical enlargement a row of balls $d^9$ is interposed to reduce friction between the axle-sections, which turn in opposite directions, as will presently appear.

The axle-section $d$ carries the train of planetary gears and has compounded with it for the purpose a gear-supporting framework, comprising a pair of disks $e$ and $e'$, the latter springing from the cylindrical flange $d^5$ of the ball-box and the other disk being adjacent to one side or head of the wheel-hub. In the form of construction here shown four shafts $f$, $g$, $h$, and $i$ extend between said disks and are journaled therein, and each of said shafts carries affixed to it a spur-gear and pinion, the same being designated, respectively, by reference-letters $f'$ and $f^2$, $g'$ and $g^2$, $h'$ and $h^2$, and $i'$ and $i^2$. An internal gear $j$ is affixed to the axle member $d'$ and meshes with the pinion $f^2$, and the gear $f'$ meshes with the pinion $g^2$ on the next shaft, the gear $g'$ on said shaft meshing with the pinion $h^2$ on the next shaft, whose gear $h'$ meshes with the pinion $i^2$ on the shaft $i$. An internal gear $k$ is formed upon the cylindrical portion $b$ of the hub, centrally thereof, and the gear $i'$ meshes with said internal gear. It will now be seen that the two internal gears are connected through the train of spur-gears and pinions, so that power applied in revolution of the latter and in rotation of the internal gear $j$ will result in driving the hub and ground-wheel, and the relative speed of rotation of the driving and driven parts can be regulated by the size of the gears, as desired.

In order to derive the maximum power or speed through a self-contained gearing of the above description, I drive the internal gear $j$ in one direction and the train of planetary gears as a whole in the opposite direction. Referring to Fig. 4, it will be seen that rotation of the internal gear $j$ in the direction of the arrow 2 and revolution or orbital movement of the planetary gears in the opposite direction will have a combined effect to drive the internal gear $k$ in the direction of the arrow 3 or in the same direction that the train of planetary gear revolves, with the result of propelling the ground-wheel $a$ forward.

It will be seen that the above-described mechanism provides for multiplication of speed to any extent desired, while at the same time all the gearing is compactly arranged and thoroughly incased and protected. The train of planetary gears, moreover, supplies momentum after the manner of a fly-wheel. Any suitable means can be employed to drive the two telescoping axle-sections oppositely to each other; but I prefer to employ such an arrangement as here shown, which utilizes the weight of the rider in propulsion of the machine and requires pedal action through but about one-sixth of a circle or that portion thereof wherein foot-power is most effectively applied, the propulsive action being of an intermittent character, but effecting practically continuous rotation of the axle-sections by reason of duplication of clutches and alternating arrangement thereof and connection with the saddle and pedals. In furtherance of this object each of the shaft or axle sections $d$ and $d'$ is extended beyond its sleeve-bearing, and a pair of clutches is arranged upon the projecting portion of each shaft-section, said clutches being designated by reference-letters $m$ $m'$ and $n$ $n'$ and each comprising a disk made up of a number of segments $o$, radiating from a boss $o'$, which is affixed to the shaft, a sleeve or ring $o^2$, loosely mounted on said disk, struts $o^3$, fulcrumed in sockets of the boss $o'$, and springs $o^4$, pressing the outer ends of said struts into contact with the inner wall of the sleeve or ring $o^2$. The latter turns free of the disk in one direction; but when turned in the opposite direction becomes locked to the disk by reason of the binding of the struts. While I consider this form of clutch well adapted for the purpose, of course it is to be understood that there are many other forms that might be used in its stead. The two clutches $m$ and $m'$ are so set on the shaft-section $d$ as to provide for driving the same by forward turning of the rings, whereas the two clutches $n$ and $n'$ are so set on the shaft $d'$ as to provide for driving the latter by rearward turning of the clutch-rings. One clutch of each pair is arranged to be actuated from the saddle and the other from the pedal-shaft, and the arrangement for accomplishing this is of the following description, (see Fig. 5:)

A pedal-shaft $p$ is journaled in the crank-hanger of the frame in the usual or any suitable manner and cranks $p'$ are fastened to opposite ends of the same and equipped with pedals $p^2$; but these cranks do not make complete revolutions, the idea being to have them rise and fall, traversing about one-sixth of a circle, wherein the most effective pedal action is had. Upstanding projections or ears $p^3$ on the bosses of said crank-arms have rods $m^2$ and $n^2$ coupled to them, which rods are connected, respectively, with the rings of clutches $m$ and $n$, the rod $m^2$ operating above the center of the clutch $m$ and the rod $n^2$ operating below the center of the clutch $n$, so that turning of the pedal-shaft by depression of the pedals will be productive of rotation of the two axle-sections $d$ and $d'$ in opposite directions, the one forward and the other rearward. The rings of the other two clutches $m'$ and $n'$ are similarly coupled, respectively, to rods $m^3$ and $n^3$, which extend upwardly and connect with the forward end of a bifurcated lever $q$, pivoted intermediate its ends to a lug $q'$ on the frame and supporting the saddle $r$ in rear of its pivot. Weight imposed upon the saddle has the effect, through the lever and rods, of turning the clutch-rings and driving the axle-sections in opposite directions.

In operation the rider alternately employs the two sets of driving connections, first forcing down the pedals and in the same operation raising his weight from the saddle and then lowering his weight upon the saddle, at the same time raising his feet. The rider's motion will be similar to that sometimes followed in horseback-riding. The bicycle can, however, be propelled through but one of the sets of driving connections.

In order to protect the connections and make the structure as compact as possible, I construct the supporting-framework of the machine so as to incase the rods and clutches, the rear frame-forks comprising hollow open-ended members $r'$ and $r^2$, through which the rods $m^2 n^2$ and $m^3 n^3$ pass, and said fork members being compounded with housings $r^3$, inclosing the clutches. The sleeves $c$ and $c'$ are secured in bosses $r^4$ on the inner walls of said housings, and the outer sides of the latter are closed by caps $r^5$, centrally socketed to provide seat-bearings for the conical ends $d''$ of the shaft-sections $d$ and $d'$. For the purpose of retracting the clutch-rings and driving connections coupled thereto springs $s$ are arranged within the frame-forks, being connected therewith and with the rods, so as to be distended when the rings are turned in driving.

For the purpose of excluding dirt and dust from the bearings I form the cylindrical portion $b$ of the hub of the rear ground-wheel with end flanges $t$ and form upon the frame housings $t'$, which take over said flanges, as clearly illustrated in Fig. 2.

Of course it is to be understood that while I have here shown and described a preferred form of embodiment of my invention the same might be embodied in numerous other forms without departing from the spirit and scope of the invention.

Having thus fully described my invention, what I claim as new, and desire to secure by Letters Patent of the United States, is—

1. In a vehicle, the combination of a two-part shaft journaled in the frame; means for driving the parts of said shaft oppositely to each other; a driving-gear carried by one of said parts of the shaft; planetary gearing carried by the other of said parts with one member meshing into said driving-gear; and a ground-wheel having a hub journaled on the two-part shaft and having a gear in mesh with a member of the planetary gearing.

2. In a vehicle, the combination of a ground-wheel having a hub with an internal gear, planetary gearing one member of which meshes with said internal gear, an internal gear meshing with another member of the planetary gearing, and means for driving the latter internal gear and the planetary gearing as a whole oppositely to each other, substantially as described.

3. In a vehicle, the combination of a two-part shaft journaled in the frame, means for driving the parts of said shaft oppositely to each other, an internal gear carried by one of said parts of the shaft, planetary gearing carried by the other of said parts with one member meshing into said internal gear, and a ground-wheel having a hub journaled on the two-part shaft and having an internal gear in mesh with a member of the planetary gearing.

4. In a vehicle, the combination of a two-part shaft journaled in the frame and its members telescoping, an internal gear carried by one member of the shaft, a train of planetary gears carried by the other member of the shaft with one of its gears in mesh with said internal gear, a ground-wheel journaled on said two-part shaft, its hub incasing the gearing, and having an internal gear in mesh with the last of the train of planetary gears, and means for oppositely driving the two members of the shaft.

5. In a vehicle, the combination of a ground-wheel having a hub with an internal gear, a two-part shaft or axle on which said hub journals, the members of said shaft telescoping and one having a pair of disks, a series of shafts extending between said disks, a train of gears carried by said shafts with one of their number in mesh with the internal gear of the hub, an internal gear fastened to the other axle member and meshing with another one of the train of gears, and means for driving the two axle members in opposite directions.

6. In a vehicle, the combination of a ground-wheel whose hub has an internal gear, a two-part axle, a train of gears carried by one axle member with one of the gears meshing into the hub-gear, an internal gear carried by the other axle member and in mesh with one of the train of gears, clutches on the axle members, a seat or saddle on a vertically-movable support, and suitable connections between said support and the clutch whereby weight superimposed on the saddle will effect opposite rotative movements of the axle members, substantially as described.

7. In a vehicle, the combination of a ground-wheel whose hub has an internal gear, a two-part axle, a train of gears carried by the axle member with one of the gears meshing into the hub-gear, an internal gear carried by the other axle member and in mesh with one of the train of gears, double sets of clutches on the axle members, a pedal-shaft and pedal-equipped arms thereon, connections between the same and one clutch of each set, a vertically-movable seat or saddle support, and suitable connections between the same and the other clutch of each set, substantially as and for the purpose described.

In testimony whereof I affix my signature in presence of two witnesses.

WILLIAM H. CURTISS.

Witnesses:
 CHAS. E. RIORDON,
 STEPHEN A. BROOKS.